March 15, 1960   J. J. EBERL ET AL   2,928,717
STERILIZATION OF GUMS
Filed March 27, 1957

13 Epoxide sterilized water soluble jelly

INVENTORS:
JAMES J. EBERL
ALBERT A. STONEHILL
JOSEPH N. MASCI
BY
ATTORNEY

United States Patent Office 2,928,717
Patented Mar. 15, 1960

2,928,717

STERILIZATION OF GUMS

James J. Eberl, Moylan, Pa., and Albert A. Stonehill, Plainfield, and Joseph N. Masci, Metuchen, N.J., assignors to Johnson & Johnson, a corporation of New Jersey Application March 27, 1957, Serial No. 648,809

16 Claims. (Cl. 21—58)

This invention relates to the sterilization of aqueous solutions or dispersions of gums by means of an epoxide such as ethylene oxide or propylene oxide, and to the resulting sterilized viscous solutions or gels.

Viscous aqueous fluids or gels containing gums are useful in the surgical, cosmetic, and pharmaceutical fields. For some purposes, it is desired that these materials be sterile. Many such materials are not heat-stable, and accordingly, when the gum is sterilized by the usual method of application of steam under pressure, the dispersion is ruined for the intended purpose; i.e., there is an undue loss of viscosity. The art is confronted by the problem of providing such aqueous gum solutions or dispersions in sterile form and having the desired viscosity characteristics.

The discoveries associated with the invention relating to solutions of the above problems, and the objects achieved in accordance with the invention as set forth herein, include: the provision of a process for sterilizing an aqueous gum dispersion of a gum which undergoes undue degradation or loss of viscosity when steam sterilized in such dispersion form, which process includes preparing an aqueous mixture of a concentration of the gum in the range of 0.1 to 75% by weight to give a final dispersion having a viscosity in the range of 50 to 100,000 centipoises, 0.5 to 3% by weight of a lower epoxide of 2 to 3 carbon atoms, having a pH in the range of 4 to 8, sealing the resulting mixture in an air-tight container and maintaining it at a temperature in the range of 70 to 120° F. for a time in the range of 4 days to 2 weeks whereby a bland and non-irritating packaged sterile aqueous gum dispersion is obtained having a viscosity in the range of 50 to 100,000 centipoises; the provision of such a process wherein the gum is selected from the group consisting of tragacanth, arabic, karaya, acacia, alginates, sodium carboxymethyl cellulose, Irish moss and mixtures thereof; the provision of such a process wherein the gum is Irish moss and the mixture includes 5 to 25% of glycerin; the provision of the products obtained by the foregoing processes, especially a lubricating jelly having a viscosity in the range of 30,000 to 55,000 centipoises, and other objects which will be apparent as details or embodiments of the invention are set forth hereinafter.

Figure 1:
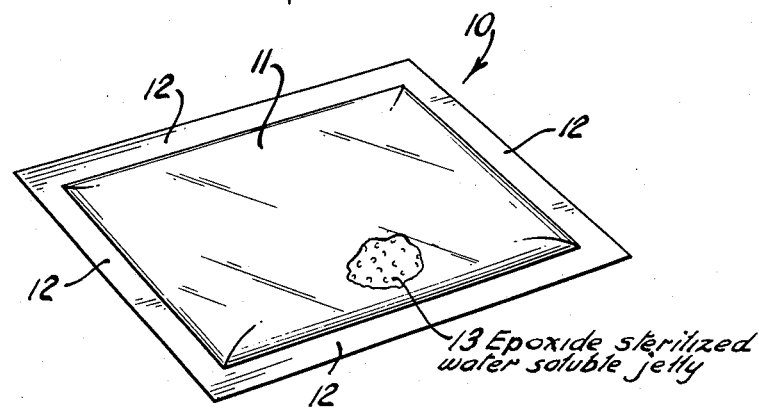
Figure 2:
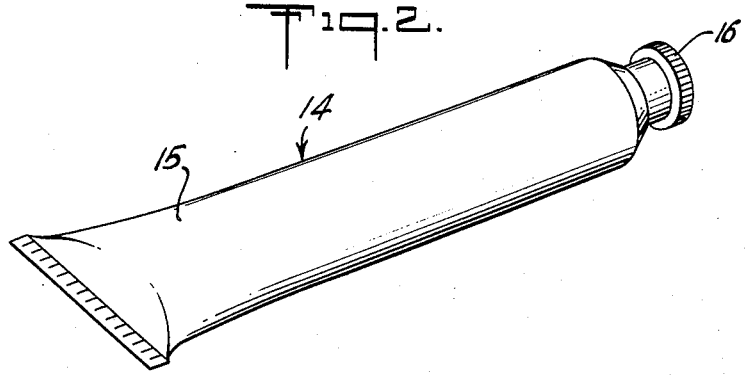

The invention will be described with reference to the accompanying drawing wherein Figure 1 is a top view of a sealed plastic or foil or the like container with a portion broken away to illustrate epoxide sterilized water soluble jelly. Figure 2 illustrates a conventional collapsible tube which may be used for packaging the gum dispersion.

Referring to Figure 1, the package 10 includes an upper sheet 11 and a corresponding lower sheet (not shown) and sealed edges 12. The epoxide sterilized jelly 13 is indicated in the broken away portion. Referring to Figure 2, the tube 14 includes the outer wall 15 with conventional lower seal and the removable cap 16.

In order to facilitate a clear understanding of the invention, the following preferred embodiments are described in detail.

*Example 1*

The following materials are mixed with efficient agitation.

Gum tragacanth vegetable gum _____ grams__ 18
Boric acid _____ do____ 16
Ethyl alcohol _____ cubic centimeters__ 120
Propylene glycol _____ do____ 120
Water to make a 1000 cubic centimeter volume.

The pH of this mixture is about 5.0. To the resulting composition there is added Propylene oxide _____ grams__ 2.1 and this is mixed thoroughly therewith. Portions of the resulting composition are sealed in separate air-tight non-sterile containers at atmospheric pressure (e.g., collapsible tubes with tight fitting caps). These tubes are maintained at room temperature.

Periodic tests are made, day by day, for the disappearance of propylene oxide and in some tubes tested, the epoxide has completely disappeared in four days, and in others in six days; and in a longer series of tests, no trace of propylene oxide is found after seven days. The presence of propylene oxide is detected by a modification of the Deckert test by adding one drop of 1:1000 phenolphthalein to one to two cubic centimeters of forty percent potassium thiocyanate solution in a test tube. One cubic centimeter of the material under test, diluted by five cubic centimeters of water is mixed with this solution. If no red or pinkish color appears after the test tube has been warmed for exactly two minutes, the material can be considered free from the epoxide.

*Example 2*

A dispersion was prepared in accordance with the preceding example, having a pH of about 5, and a separate portion thereof was inoculated with a spore suspension of B subtilis by adding thereto 1 cc. of the suspension for each kilogram. Control samples of each of these inoculated samples were taken before the incorporation of the propylene oxide and filled into non-sterilized collapsible tubes. The remainder of each inoculated sample was treated with liquid propylene oxide to produce a concentration of 1% by weight propylene oxide. The treated samples were then introduced into non-sterile collapsible tubes with tight-fitting caps for testing for sterility; e.g., hermetically sealed in wax-lined aluminum tubes. All samples were stored at 70° F.

The samples were tested for sterility, using standard techniques with the three test media: Thioglycollate, Sabouraud, and nutrient Broth. In tests at the end of one day, two day, four day, one week, and two week storage periods, the samples treated with propylene oxide were all sterile, whereas the controls were non-sterile even at the end of the two week period. The treated samples were useful and had desirable viscosity characteristics.

*Example 3*

A 3500 gram batch was prepared by dispersing 1.47% Irish moss by weight in water at 180° F. with efficient agitation, followed by overnight storage. Water lost during the storage was replenished and the dispersion was adjusted to a pH of 6.0 by adding boric acid.

The batch was divided into two parts. Samples of one part were diluted with 6% water by weight, tubed in hermetically sealed, wax-lined aluminum collapsible tubes and stored at 70° F.

Another portion of the above batch was inoculated with a spore suspension of B subtilis, and samples of the resulting material were tubed and stored at 70° F. for inoculation control purposes. Other samples of this portion were mixed with 1% by weight propylene oxide and 4% by weight of water and then tubed and stored at 70° F.

Another portion of the above batch was adjusted to a pH of 4 by the addition of hydrochloric acid, and a series of tubed samples analogous to the foregoing was prepared therefrom.

At the end of a seven day storage period, there was no epoxide present and the samples were tested for sterility and viscosity. The propylene oxide treated samples and the inoculated untreated controls, were tested for sterility according to the procedure recommended in the United States, Pharmacopeia XV, using Fluid Thioglycollate and Fluid Sabouraud media. The viscosity readings were taken with a Brookfield Syncro-lectric Viscometer Model LVT. This instrument is described in Remington's "Practice of Pharmacy," Martin & Cook, 11th edition, 1956, p. 205.

All the propylene oxide treated samples were sterile (30 tubes in each test) whereas the inoculated control samples produced positive growths in all cases; i.e., they were nonsterile. As to viscosity (determined in cps. at 25° C.), at the end of the storage period, at pH 4, the control showed 250 whereas the epoxide treated material showed 290. This is an actual increase. At pH 6, the control showed 390 and the epoxide treated material showed 360, which is a slight decrease; but this is not at all objectionable inasmuch as the dispersion retained substantially its useful viscosity properties.

At higher gram concentrations, more viscous compositions are obtained, e.g., having a viscosity in the range of about 30,000 to 55,000 centipoises.

*Example 4*

Following the above procedure, a batch was prepared by dispersing 2.28% by weight of algin in water. Its pH was adjusted to 6 with boric acid (i.e., by adding acid), and a portion thereof was further adjusted to a pH of 4 by the addition of potassium bitartrate. Corresponding samples were tubed and tested as above, and the following results were obtained. All the propylene oxide treated samples were free of the oxide as such and were sterile, whereas the controls were non-sterile. As to viscosity, the pH 4 control showed 4910, and the epoxide treated material showed 3710; the pH 6 control showed 604, and the epoxide treated material showed 572. The treated material showed some decrease in viscosity, but the product is still useful in view of its desirable viscosity characteristics.

At higher gram concentrations, more viscous compositions are obtained, e.g., having a viscosity in the range of about 30,000 to 55,000 centipoises.

*Example 5*

Following the above procedure, a batch was prepared by dispersing 1.14% by weight of sodium carboxymethyl cellulose in water. Its pH was adjusted to 6 with boric acid, and a portion thereof was further adjusted to a pH of 4 by the addition of potassium bitartrate. Corresponding samples were tubed and tested as above, and the following results were obtained. All the propylene oxide treated samples were free of the oxide as such and were sterile, whereas the controls were non-sterile. As to viscosity, the pH 4 control showed 3984, and the epoxide treated material showed 3596; the pH 6 control showed 3542, and the epoxide treated material showed 2924. The treated material showed some decrease in viscosity, but the product is still useful in view of its desirable viscosity characteristics.

At higher gram concentrations, more viscous compositions are obtained, e.g., having a viscosity in the range of about 30,000 to 55,000 centipoises.

*Example 6*

Following the procedure of Example 3, a batch was prepared by dispersing 1.43% by weight of Irish moss and 15% by weight of glycerin in water. Its pH was adjusted to 6 with boric acid, and a portion thereof was further adjusted to a pH of 4 by the addition of potassium bitartrate. Corresponding samples were tubed and tested as above, and the following results were obtained. All the propylene oxide treated samples were free of the oxide as such and were sterile, whereas the controls were non-sterile. As to viscosity, the pH control showed 3280, and the epoxide treated material showed 3360; the pH 6 control showed 3392, and the epoxide treated material showed 3508. The treated material showed some increase in viscosity, but the product is still useful in view of its desirable viscosity characteristics.

At higher gram concentrations, more viscous compositions are obtained, e.g., having a viscosity in the range of about 30,000 to 55,000 centipoises.

*Example 7*

Following the above procedure, a batch was prepared by dispersing 35% by weight of acacia in water. A portion thereof was adjusted to a pH of 4 by the addition of potassium bitartrate. Another portion was adjusted to a pH of 6 by the addition of potassium hydroxide. Corresponding samples were tubed and tested as above, and the following results were obtained. All the propylene oxide treated samples were free of the oxide as such and were sterile, whereas the controls were non-sterile. As to viscosity, the pH 4 controls showed 178, and the epoxide treated materials showed 185; the pH 6 control showed 163, and the epoxide treated material showed 158. These treated products are useful in view of their desirable viscosity properties.

At higher gram concentrations, more viscous compositions are obtained, e.g., having a viscosity in the range of about 30,000 to 55,000 centipoises.

Comparable results to the foregoing are achieved including the following: the propylene oxide may be replaced by ethylene oxide in equivalent amounts. However, the propylene oxide is preferred inasmuch as it is easier to handle and its vapor pressure is lower than that of ethylene oxide. Also, for some uses, the propylene oxide reaction product in the final composition may be more desirable than the corresponding ethylene oxide product.

The epoxides are converted in the presence of water to the corresponding glycol or glycols or derivatives thereof which are innocuous, and in fact, such glycol materials are commonly used in pharmaceutical or cosmetic preparations. The pH may be in the range of about 4 to 8, desirably 4 to 6 and preferably about 4.5 to 5.5. At both higher pH's and lower pH's, the composition may produce excessive irritation of the skin. The gum used may be any gum which is subject to undue degradation or loss of viscosity when dispersed in water and treated with steam in accordance with usual sterilization procedures. The preferred gums are tragacanth, arabic, karaya, acacia, alginates, sodium carboxymethyl cellulose, Irish moss and mixtures thereof. The concentration of gum or gum mixture dispersed in the water may be in the range of about 0.1 to 75%, and this amount should be selected so that the final sterilized composition has a viscosity in the range of about 50 to 100,000 centipoises; for lubricating jelly purposes, the preferred range is 30,000 to 55,000 centipoises. The concentration of the epoxide should be sufficient to achieve the desired sterilization and may be in the range of about 0.5 to 3%. The treated mixture is maintained under sterilization conditions for a sufficient time to achieve complete sterility and also complete conversion of the epoxide to the innocuous glycol or the like material, e.g., about 4 days to 2 weeks at a temperature in the range of about 70 to 120° F.

In view of the foregoing disclosures, variations or modifications thereof will be apparent, and it is intended to include within the invention all such variations and modifications except as do not come within the scope of the appended claims.

This application is a continuation-in-part of our pending application Serial No. 302,003, filed July 31, 1952, which in turn is a continuation-in-part of Serial No. 769,516, filed August 19, 1947, both of which are now abandoned.

We claim:

1. A method of preparing a bland and non-irritating packaged sterile aqueous gum dispersion of gum tragacanth, which method comprises preparing an aqueous mixture of said gum in the proportions of about:

18 grams of said gum
16 grams of boric acid
120 cc. of ethyl alcohol
120 cc. of propylene glycol
Water in an amount to make the above mixture up to 1000 cc. volume, and
2.1 grams of propylene oxide sealing said mixture in an air-tight container and maintaining the same at a temperature of about 70° F. for a time in the range of about 4 days to 2 weeks, whereby a bland non-irritating packaged sterilized aqueous gum of substantially similar viscosity is obtained.

2. A method of preparing a bland and non-irritating packaged sterile aqueous gum dispersion of a gum selected from the group consisting of gum tragacanth, arabic, karaya, acacia, alginates, sodium carboxymethyl cellulose, Irish moss and mixtures thereof, which method comprises preparing an aqueous mixture of a concentration thereof in the range of 0.1 to 75% to give a final dispersion having a viscosity in the range of 50 to 100,000 centipoises, 0.5 to 3% by weight of a lower epoxide of 2 to 3 carbon atoms, having a pH in the range of about 4 to 8, sealing said mixture in an air-tight container and maintaining it at a temperature in the range of about 70 to 120° F. for a time in the range of about 4 days to 2 weeks, whereby there is obtained a bland and non-irritating packaged sterilized gum dispersion having a viscosity in the range of 50 to 100,000 centipoises.

3. A process of claim 2 wherein the gum is algin, the pH is in the range of 4 to 6.

4. A process of claim 2 wherein the gum is sodium carboxymethyl cellulose, the pH is in the range of 4 to 6.

5. A process of claim 2 wherein the gum is acacia, the pH is in the range of 4 to 6.

6. A process of claim 2 wherein the gum is tragacanth, the pH is in the range of 4 to 6, and the viscosity is in the range of 30,000 to 55,000.

7. A process of claim 2 wherein the gum is Irish moss, the pH is in the range of 4 to 6.

8. A process of claim 7 wherein the mixture includes 5 to 20% by weight of glycerin, the pH is in the range of 4 to 6.

9. A packaged sterile aqueous gum dispersion which is bland and non-irritating comprising a mixture of 18 grams of gum tragacanth
16 grams of boric acid
120 cc. of ethyl alcohol
120 cc. of propylene glycol
Water in an amount to make the above mixture up to 1000 cc. volume, in an air-tight container obtained by the process of claim 1.

10. A packaged bland and non-irritating sterile aqueous gum dispersion of a gum selected from the group consisting of gum tragacanth, arabic, karaya, acacia, alginates, sodium carboxymethyl cellulose, Irish moss and mixtures thereof, the concentration of said gum being in the range of 0.1 to 75% by weight of said dispersion, and said dispersion having a viscosity in the range of 50 to 100,000 centipoises and a pH in the range of about 4 to 8, in an air-tight container obtained by the process of claim 2.

11. A packaged sterile aqueous gum of claim 10 wherein the gum is algin.

12. A packaged sterile aqueous gum of claim 10 wherein the gum is sodium carboxymethyl cellulose.

13. A packaged sterile aqueous gum of claim 10 wherein the gum is acacia.

14. A packaged sterile aqueous gum of claim 10 wherein the gum is tragacanth, the pH is in the range of 4 to 6, and the viscosity is in the range of 30,000 to 55,000.

15. A packaged sterile aqueous gum of claim 10 wherein the gum is Irish moss.

16. A packaged sterile aqueous gum of claim 15 wherein the mixture includes 5 to 20% by weight of glycerin.

References Cited in the file of this patent

UNITED STATES PATENTS

| | | |
|---|---|---|
| 2,075,845 | Gross | Apr. 6, 1937 |
| 2,189,949 | Griffith | Feb. 13, 1940 |

OTHER REFERENCES

Am. Jour. of Hygiene, vol. 50, 1949, pp. 270–279.